April 2, 1935.　　　E. E. MEUSY　　　1,996,164
GAS COCK
Filed July 5, 1934
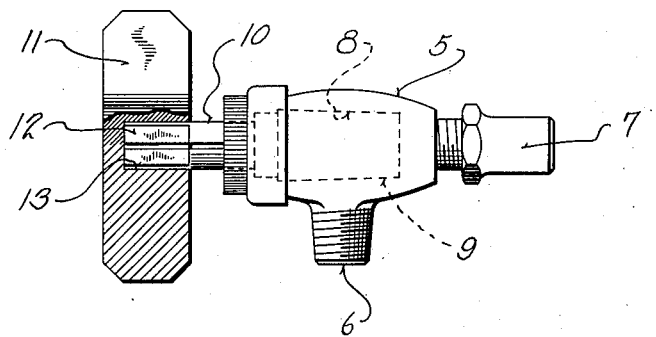
Fig. 1.
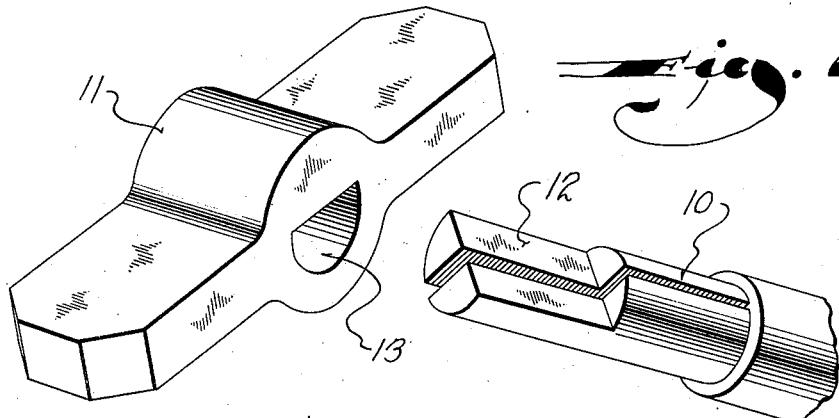
Fig. 2.
Fig. 3.
Inventor:
Eugene E. Meusy
By Ira Milton Jones
A. Warner Patented Apr. 2, 1935

1,996,164

UNITED STATES PATENT OFFICE 1,996,164

GAS COCK

Eugene E. Meusy, Milwaukee, Wis., assignor to Milwaukee Gas Specialty Company, Milwaukee, Wis., a corporation of Wisconsin Application July 5, 1934, Serial No. 733,829

4 Claims. (Cl. 287—53)

REISSUED

This invention relates to improvements in gas cocks and refers more particularly to the attachment of handles to their valve stems.

Heretofore, the handles were generally secured to the valve stems of gas cocks by means of transverse screws, which by reason of the necessarily small dimensions of the stems had to be small. Service men called on to service gas cocks found difficulty in dealing with these small parts and as a consequence much agitation for either larger dimensioned arrangements or other suitable relief developed.

Also, the screws became loose and were often lost in service allowing the handles to come off.

The problem became more acute with the requirement for affording quick removal of the apron which encloses the gas cocks of modern gas ranges.

With the foregoing facts in mind, the present invention has as its object to provide a novel and simplified manner of securing handles to valve stems of gas cocks which will completely obviate the need for screws or other securing means and will afford a secure connection permanently free from play but at the same time readily detachable.

Another object of this invention is to provide means for securing a handle to a valve stem which is automatically operable to secure the handle in position merely by the application of the handle to the stem.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side elevational view of a gas cock having a handle attached to its stem in accordance with this invention;

Figure 2 is a perspective view of the outer end portion of the valve stem; and

Figure 3 is a perspective view of the handle shown detached from the stem.

Referring now more particularly to the accompanying drawing, the numeral 5 designates the body of a conventional gas cock having a threaded inlet end 6 connectible to a stringer pipe and an outlet provided with a discharge jet 7. As is customary, the body of the gas cock has a tapered bore 8 communicating with the inlet end 6 and the discharge jet 7, and receiving therein a tapered plug 9.

The plug 9 is secured in the tapered bore in any suitable manner and has an outer projecting end or stem 10 to which a handle 11 is secured.

To preclude relative rotation between the handle and stem the outer end portion of the stem has one side cut away or slabbed off so that the end portion of the stem has a substantially D-shaped cross section bounded at one side by a flat surface 12, and the socket 13 in the handle which receives the stem is of corresponding cross sectional shape.

The D-shaped outer end portion of the stem is slit longitudinally perpendicularly to the flat surface 12 to divide the same into two spaced quadrant-like sections or fingers. Prior to the application of the handle to the stem, these sections are spread apart, and inasmuch as the stem and tapered plug is formed of hard brass or some suitable material having a considerable degree of resiliency, the spaced fingers continue to exert an outward spring tension after the handle is applied thereto, to thus hold the handle in position.

In this manner the handle is secured to the stem in an exceedingly simple and efficient manner, while at the same time quick detachment for purposes of replacement is permitted.

What I claim as my invention is:

1. In a gas cock having a rotatable valve with a stem projecting therefrom and a handle to turn the valve, a readily detachable connection between the handle and stem comprising a substantially D-shaped socket in the handle, and a plurality of spring fingers integral with the stem and having a composite cross sectional size and shape to fit the D-shaped socket, said fingers being yieldingly spread apart toward the ends of their composite D-shape so that upon being squeezed together during insertion into the socket the coaction between the curved surfaces of the D-shaped socket and the fingers guides the fingers in their movement produced by their tendency to spread apart to engage firmly in the corners of the D-shaped socket and thereby provide a firm connection entirely free from play.

2. In a gas cock having a body bored to provide a valve seat, a valve rotatable therein and having a stem projecting from the body and a handle mounted on the stem to turn the valve, a readily detachable connection between the handle and stem comprising a substantially D-shaped socket in the handle to receive part of the projecting portion of the stem, an abutment on the projecting stem portion inwardly of its outer end to provide a stop limiting the insertion of the stem into the handle, said part of the projecting stem portion outwardly of the abutment having a cross sectional size and shape to fit the D-shaped socket in the handle, and said projecting portion of the stem being slit longitudinally to divide substantially the entire projecting portion of the stem into spaced sections yieldingly spread apart in a direction substantially parallel to the flat side of the D so that upon being squeezed together during insertion of said stem and portion into the socket, the tendency of the fingers to spread apart acting in conjunction with the guiding effect of the curved surface to surface engagement between the socket and stem end portion forces the stem sections into firm engagement with the opposite corners of the D-shaped socket to afford a firm connection between the stem and handle entirely free from play.

3. In a gas cock having a rotatable valve with a cylindrical stem projecting therefrom and a handle to turn the valve mounted on the stem, the outer end portion of the stem being slabbed off to give the same a substantially D-shape in cross section and the handle having a correspondingly D-shaped socket to receive the D-shaped end portion of the stem, said stem also being slit longitudinally to divide the substantially D-shaped end portion thereof into two quadrant-like sections which are yieldingly spread apart so that the D-shaped end portion of the stem is deformed from its normal cross sectional shape and so that the said sections of the stem are squeezed together during insertion thereof into the handle socket and through the coaction of the curved surfaces of the stem sections and socket said sections are driven by their tendency to spread apart into positions firmly engaging in the corners of the D-shaped socket.

4. In a gas cock having a rotatable valve with a stem projecting therefrom and a handle for turning the valve, the handle having a socket of non-circular shape and comprising curved and straight walls in cross section with opposite corners defined by meeting walls of the socket, a plurality of spring fingers integral with the stem and insertable into the socket, said fingers having a composite non-circular cross sectional shape comprising curved and straight walls with certain meeting walls forming corner edges engageable in the said corners of the socket, and having surfaces arranged to slide on adjacent surfaces of the socket as a result of the tendency of said fingers to spread so as to guide the corner edges of the fingers into snug engagement with said corners of the socket upon application of the handle to the stem.

EUGENE E. MEUSY.